(12) United States Patent
Ruiz et al.

(10) Patent No.: US 10,182,574 B2
(45) Date of Patent: Jan. 22, 2019

(54) FLATBREAD MACHINE WITH AN AUTOMATIC FLATBREAD PREPARATION METHOD BASED ON DOUGH CAPSULES AND A PACKAGING SYSTEM

(71) Applicant: FLATEV AG, Zürich (CH)

(72) Inventors: Carlos Ruiz, Zurich (CH); Jonas Müller, Zurich (CH); Louis Renaud Paul François Frachon, Zollikon (CH)

(73) Assignee: FALTEV AG, Zurich (CH)

( * ) Notice: Subject to any disclaimer, the term of this patent is extended or adjusted under 35 U.S.C. 154(b) by 383 days.

(21) Appl. No.: 14/379,546

(22) PCT Filed: Feb. 21, 2013

(86) PCT No.: PCT/IB2013/051418
§ 371 (c)(1),
(2) Date: Aug. 19, 2014

(87) PCT Pub. No.: WO2013/124809
PCT Pub. Date: Aug. 29, 2013

(65) Prior Publication Data
US 2015/0044340 A1 Feb. 12, 2015

(30) Foreign Application Priority Data
Feb. 22, 2012 (EP) .................................... 12156609

(51) Int. Cl.
*A21B 5/00* (2006.01)
*A21B 5/03* (2006.01)
(Continued)

(52) U.S. Cl.
CPC .................. *A21B 5/00* (2013.01); *A21B 5/03* (2013.01); *A21D 8/06* (2013.01); *A21D 10/025* (2013.01);
(Continued)

(58) Field of Classification Search
CPC .......... A21B 5/00; A21B 5/03; A21D 10/025; A21D 8/06; A21D 13/42; B65D 1/32; B65D 77/2028
See application file for complete search history.

(56) References Cited

U.S. PATENT DOCUMENTS 5,366,744 A * 11/1994 Drummond ............ A21D 6/001
426/128
5,937,739 A 8/1999 Schultz
2008/0011767 A1 1/2008 Beavers Blanks

FOREIGN PATENT DOCUMENTS

EP 1486431 A1 12/2004
EP 1902620 A1 3/2008
(Continued)

OTHER PUBLICATIONS

Google patents english translation FR2672774; pp. 1-10. Vasseneix et al.*

*Primary Examiner* — Steven Leff
(74) *Attorney, Agent, or Firm* — Edwin D. Schindler

(57) ABSTRACT

An automated preparation of flatbread, particularly tortillas, by an apparatus for includes packing dough portions in capsules for enabling the dough to be suitable for extended refrigerated and unrefrigerated storage. The capsules are gas-tight sealed with a foil and conveyed in upside-down position on a conveyor belt. The foil is removed by two adjacent shafts which grip the foil and tear it off. The capsule is then positioned on a holding ring and the dough portion falls downwardly onto a lower pressing and baking plate. An upper pressing and baking plate swivels downwardly by an actuator for pressing and baking the dough. After lifting the upper plate away, the finished flat bread glides out of the apparatus.

5 Claims, 14 Drawing Sheets

Figure 3:
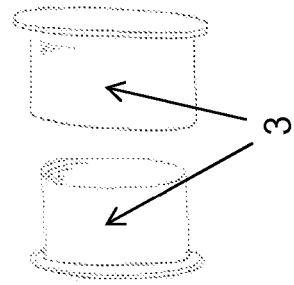

(51) Int. Cl.
*A21D 10/02* (2006.01)
*B65D 1/32* (2006.01)
*B65D 77/20* (2006.01)
*A21D 8/06* (2006.01)
*A21D 13/42* (2017.01)

(52) U.S. Cl.
CPC ............... *A21D 13/42* (2017.01); *B65D 1/32* (2013.01); *B65D 77/2028* (2013.01)

(56) References Cited

FOREIGN PATENT DOCUMENTS

| FR | 2672774 A1 | 8/1992 |
| FR | 2764417 A1 | 12/1998 |
| GB | 2399274 A | 9/2004 |

\* cited by examiner

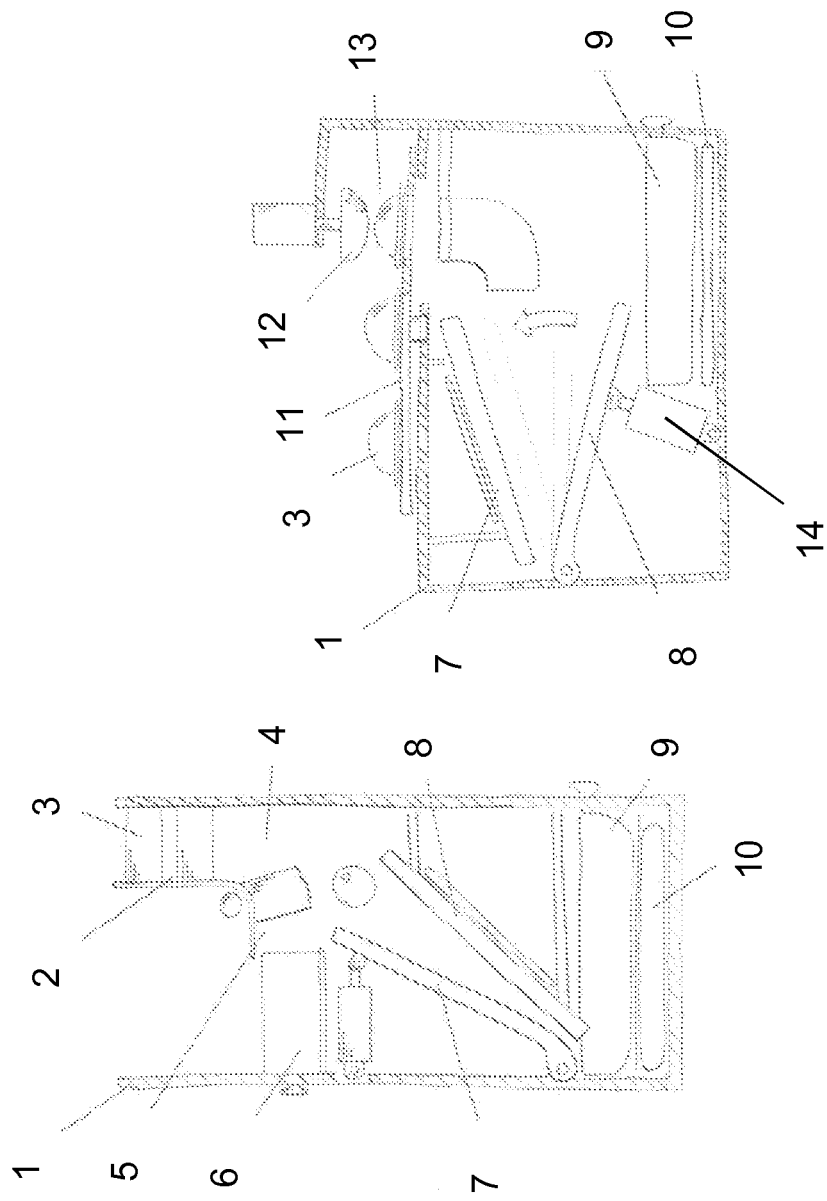

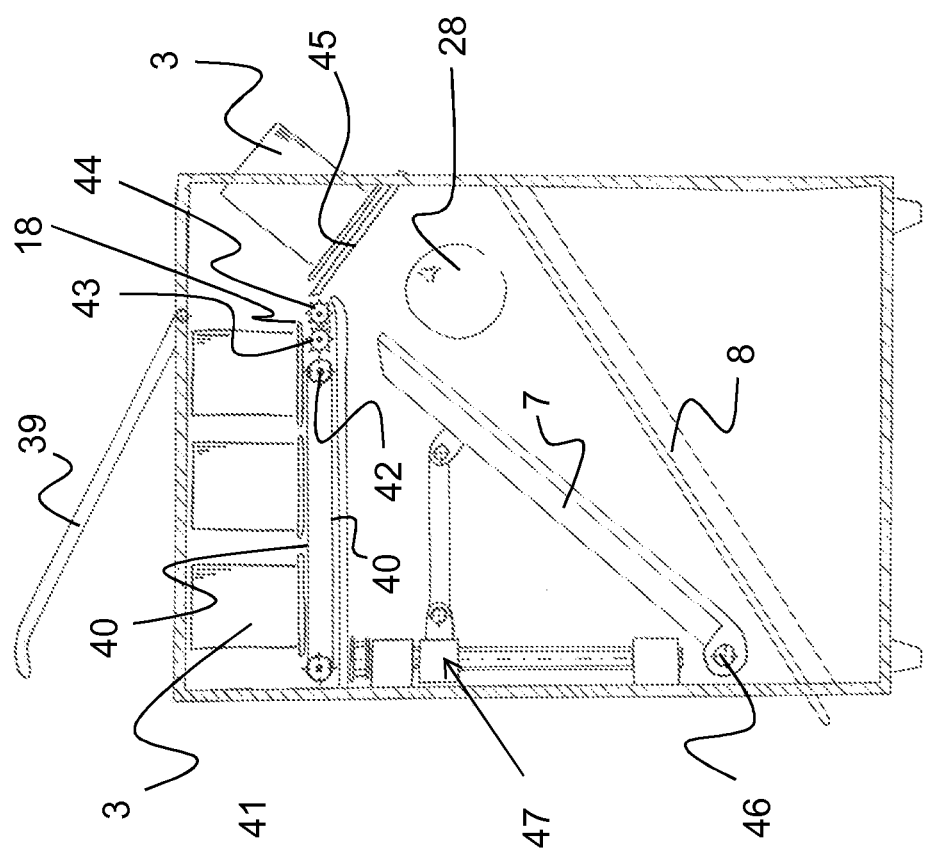

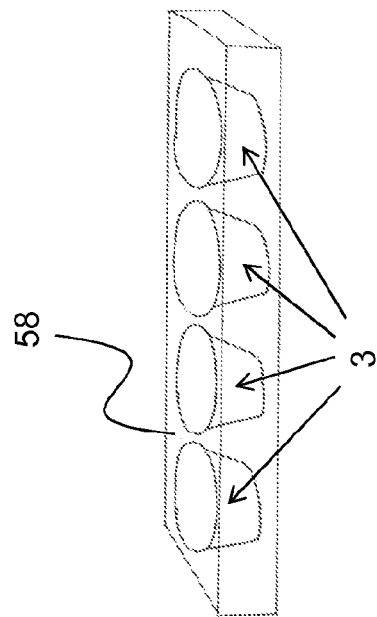
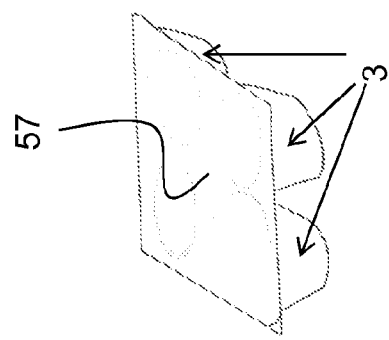
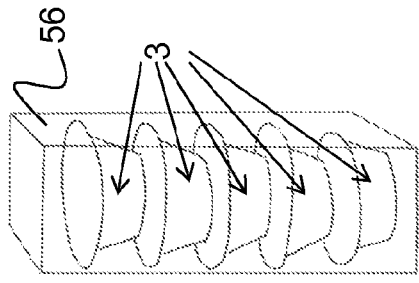
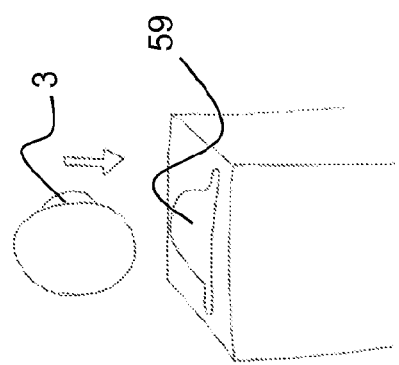
Fig. 35
Fig. 34
Fig. 36
Fig. 33

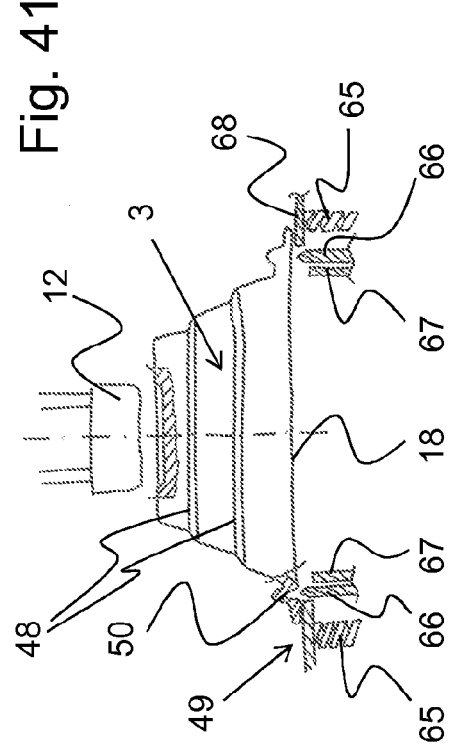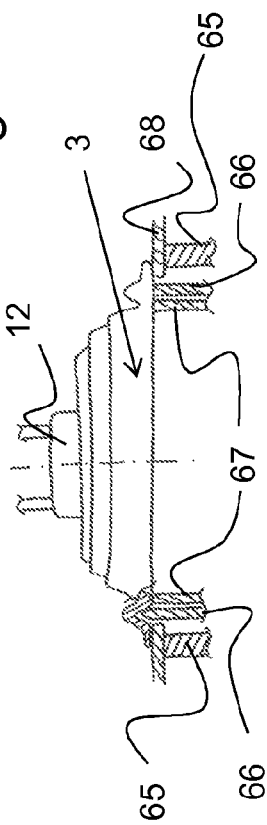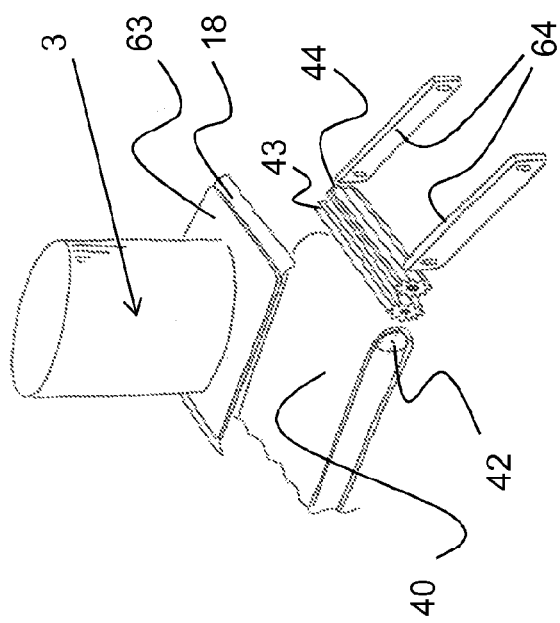

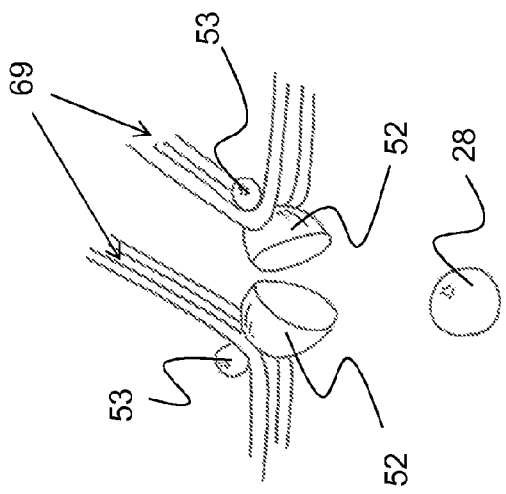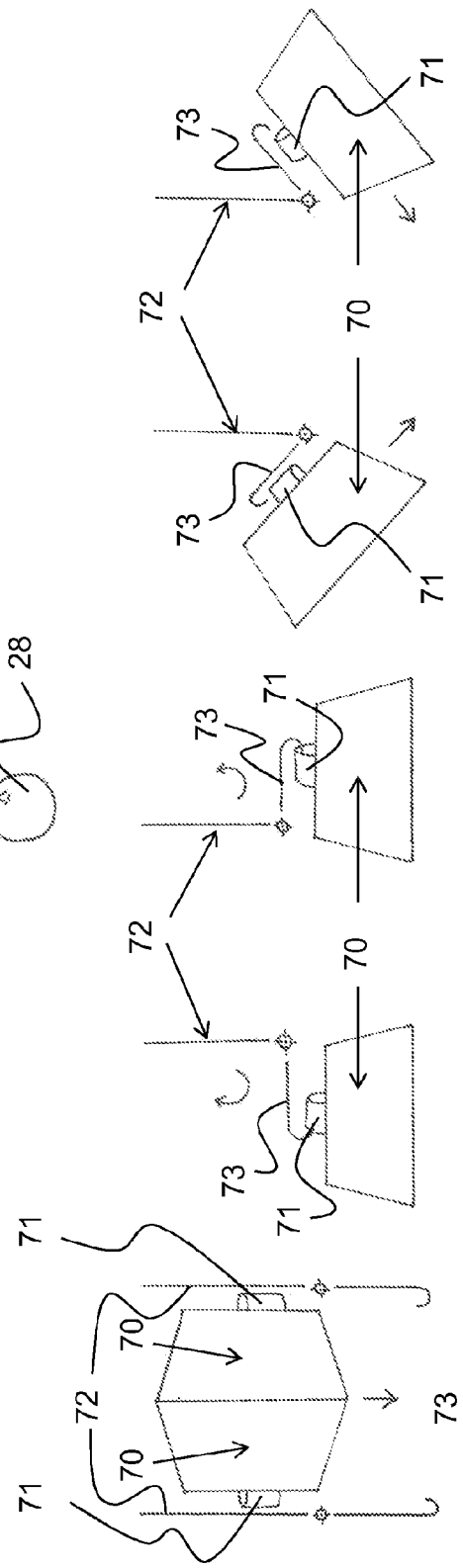

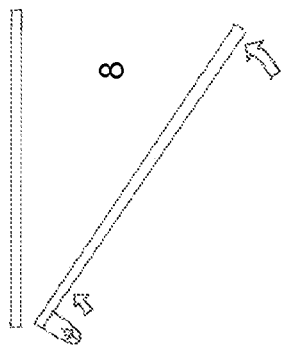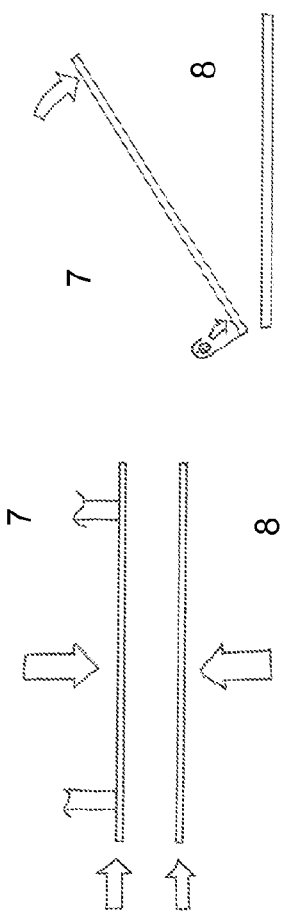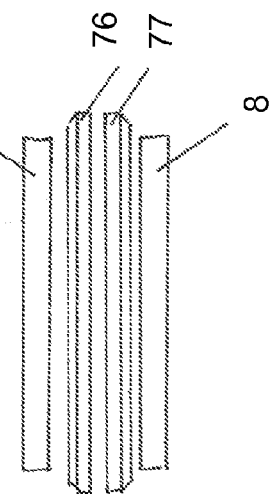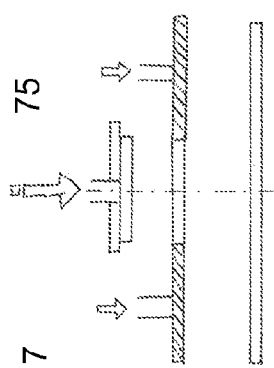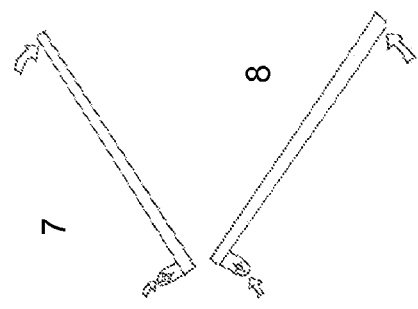

FLATBREAD MACHINE WITH AN AUTOMATIC FLATBREAD PREPARATION METHOD BASED ON DOUGH CAPSULES AND A PACKAGING SYSTEM

BACKGROUND OF THE INVENTION

Flatbreads are being produced by millions every day. In most cases, flatbreads are prepared whenever they are needed. But the traditional preparation of homemade fresh flatbreads is till today extremely laborious. In order to prepare fresh dough for flatbreads with the right consistency and flavor, it takes a lot of time, it requires know-how and some experience. Although the existing domestic machines or more industrialized machines for small enterprises, as restaurants, try to simplify this work, the preparation of homemade flatbread is still very laborious. Nowadays machines which are able to produce tortillas at a fully automated process are very costly, big and have to be monitored by humans. Therefore they are not very likely to be installed in any household. These are some reasons why many consumers or small enterprises buy industrially manufactured flatbreads which are often made in relatively large quantities. Those flatbreads which are widely available, suffer in quality to some extent by mass production and the natural decrease in freshness because of shelf time or the use of preservatives.

In the course of mixing the dough flour, water and other ingredients there are many factors that may influence the consistency and texture of the dough. For example the temperature of the water may affect the consistency and its taste. The preparation process is very complicated to achieve by persons without enough experience, know-how or time.

While patents such as the U.S. Pat. No. 5,366,744 from Drummond et al. describe a method for making packaged leavened dough suitable for extended refrigerated storage, this method does not provide an automatic separation of the dough from the tray. The consumer must remove the dough product from the tray at the time of baking and place the dough product into a baking sheet or other appropriate baking utensil.

At present, there are only pre-baked flatbreads available on the market. These are flatbreads which were baked for a part-time of the entire baking process and then packaged into plastic packaging. Before eating, those pre-baked flatbreads are finished and fully baked either in a stove or in a microwave device. However, the taste of such flatbreads never reach the richness and freshness of handmade and instantly made flatbreads.

SUMMARY OF THE INVENTION

It is therefore an objective of the present invention to provide a new method and apparatus or the fully automatic and instant preparation and baking of flatbreads of all kinds and sorts. The invention also comprises a means for the intermediate packaging and storage of dough portions for distribution and for storage in such an apparatus so the apparatus is able to deliver fresh made flatbreads at any time and instantly.

The invention provides a method for a fully automatic preparation of flatbreads such as tortilla, naan, ruti, piadina, etc. with a flatbread machine for use at home or in enterprises that can bake and deliver fresh made flatbreads at any time—just at the push of a button. The innovation includes dough portions packed in capsules that include a system that enables the dough to be suitable for extended refrigerated and unrefrigerated storage.

BRIEF DESCRIPTION OF THE DRAWING FIGURES

In the figures, various aspects of the method, the packaging of the dough portions and apparatus for processing the dough portions and its baking and delivery are shown by way of examples.

Figure 4:
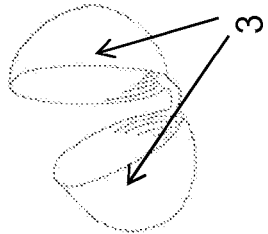
Figure 5:
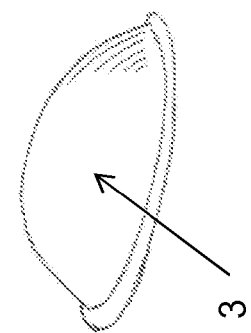
Figure 6:
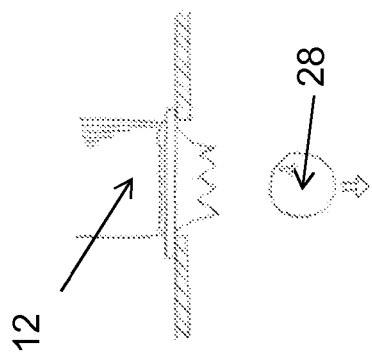
Figure 7:
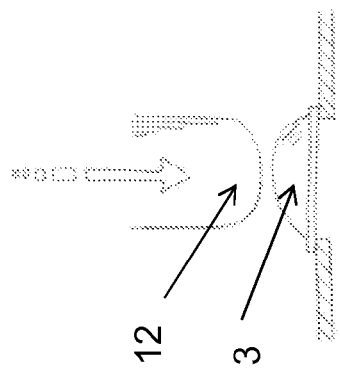
Figure 8:
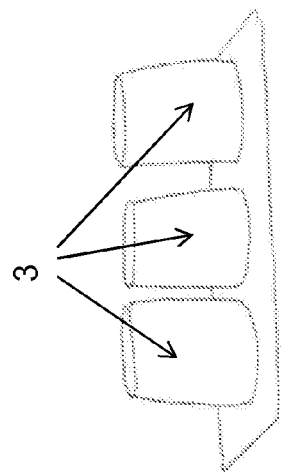
Figure 9:
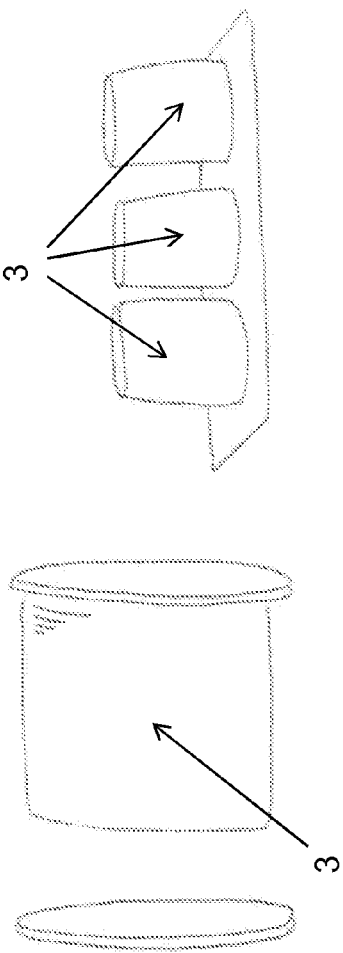
Figure 11:
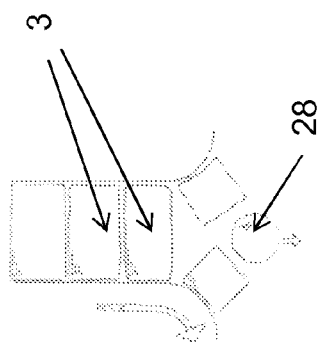
Figure 10:
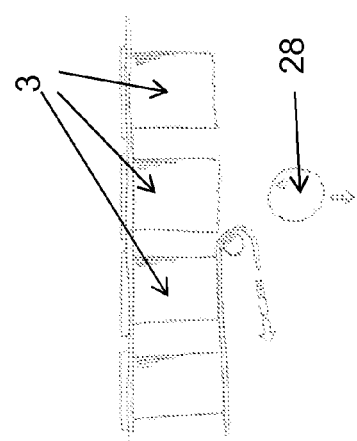
Figure 12:
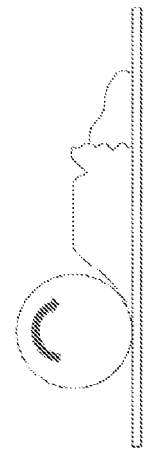
Figure 13:
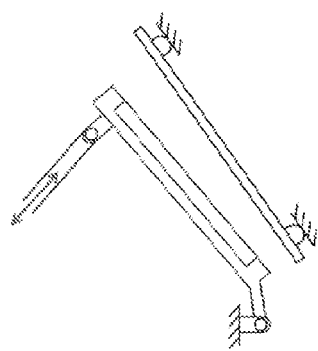
Figure 14:
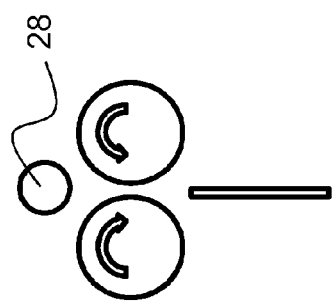
Figure 15:
Figure 16:
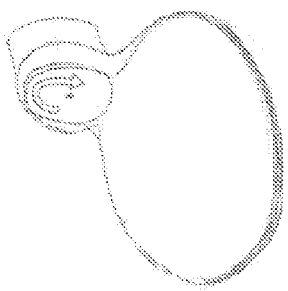
Figure 17:
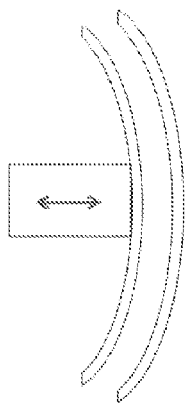
Figure 19:
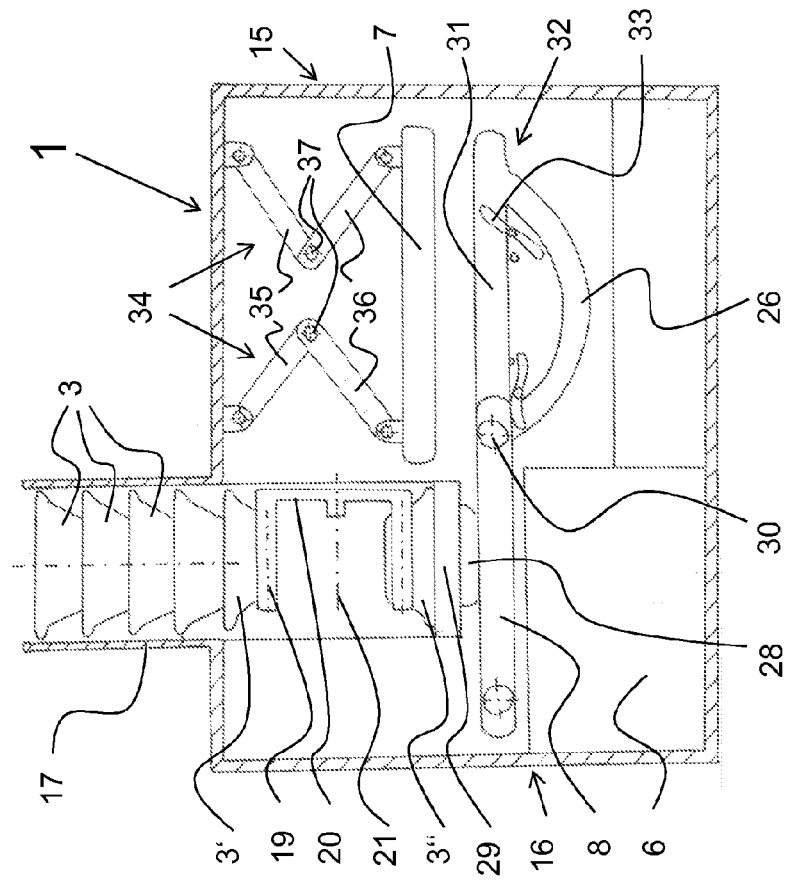
Figure 18:
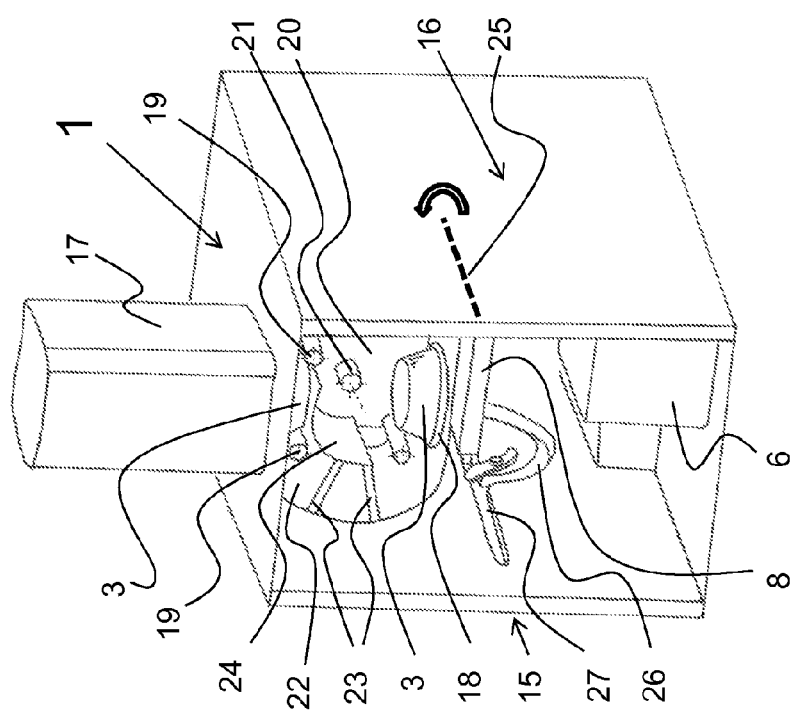
Figure 21:
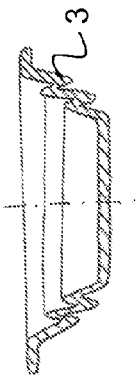
Figure 24:
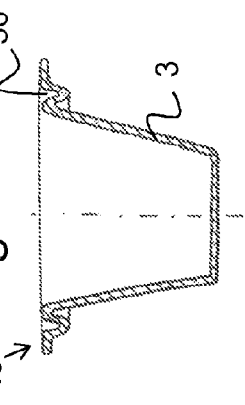
Figure 23:
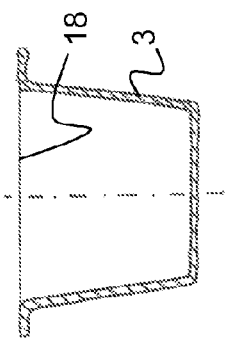
Figure 22:
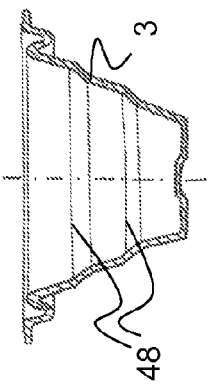
Figure 25:
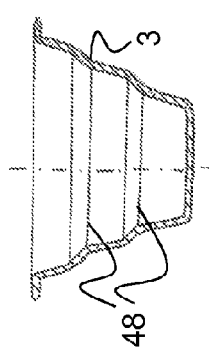
Figure 26:
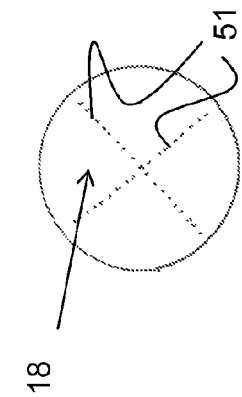
Figure 27:
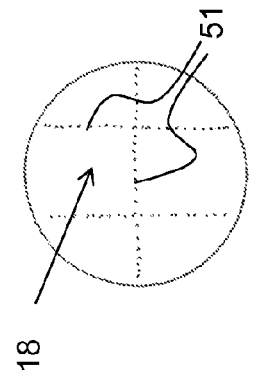
Figure 28:
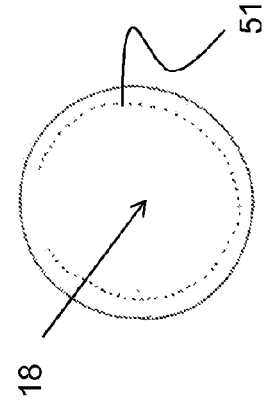
Figure 31:
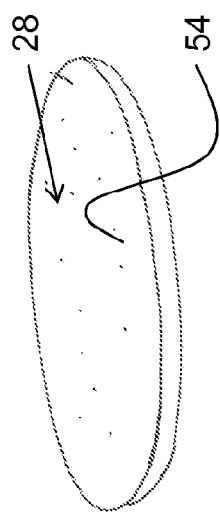
Figure 30:
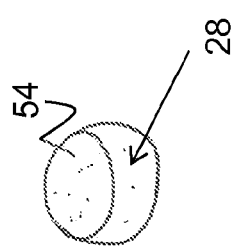
Figure 29:
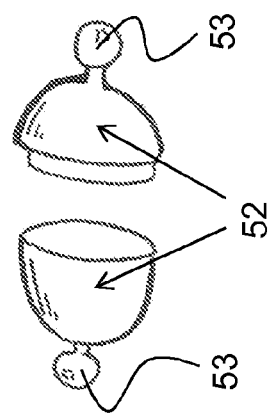
Figure 32:
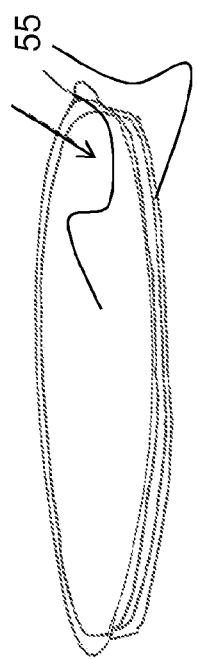
Figure 37:
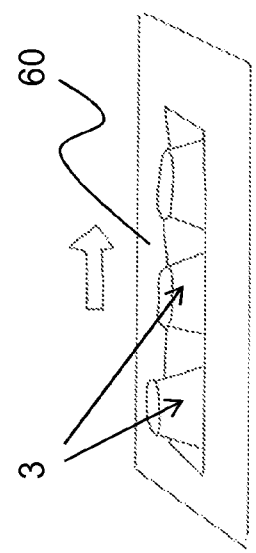
Figure 38:
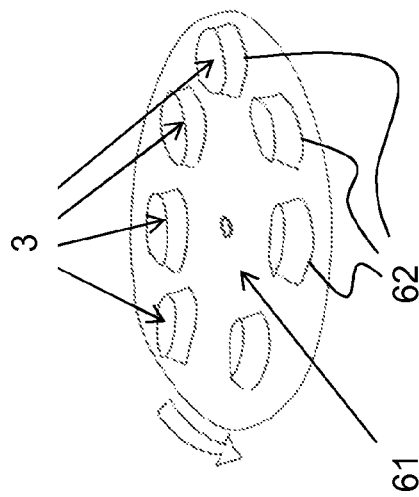
Figure 39:
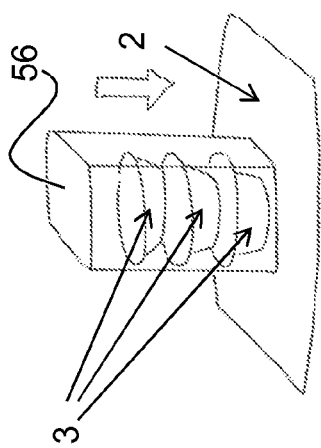
Figure 53:
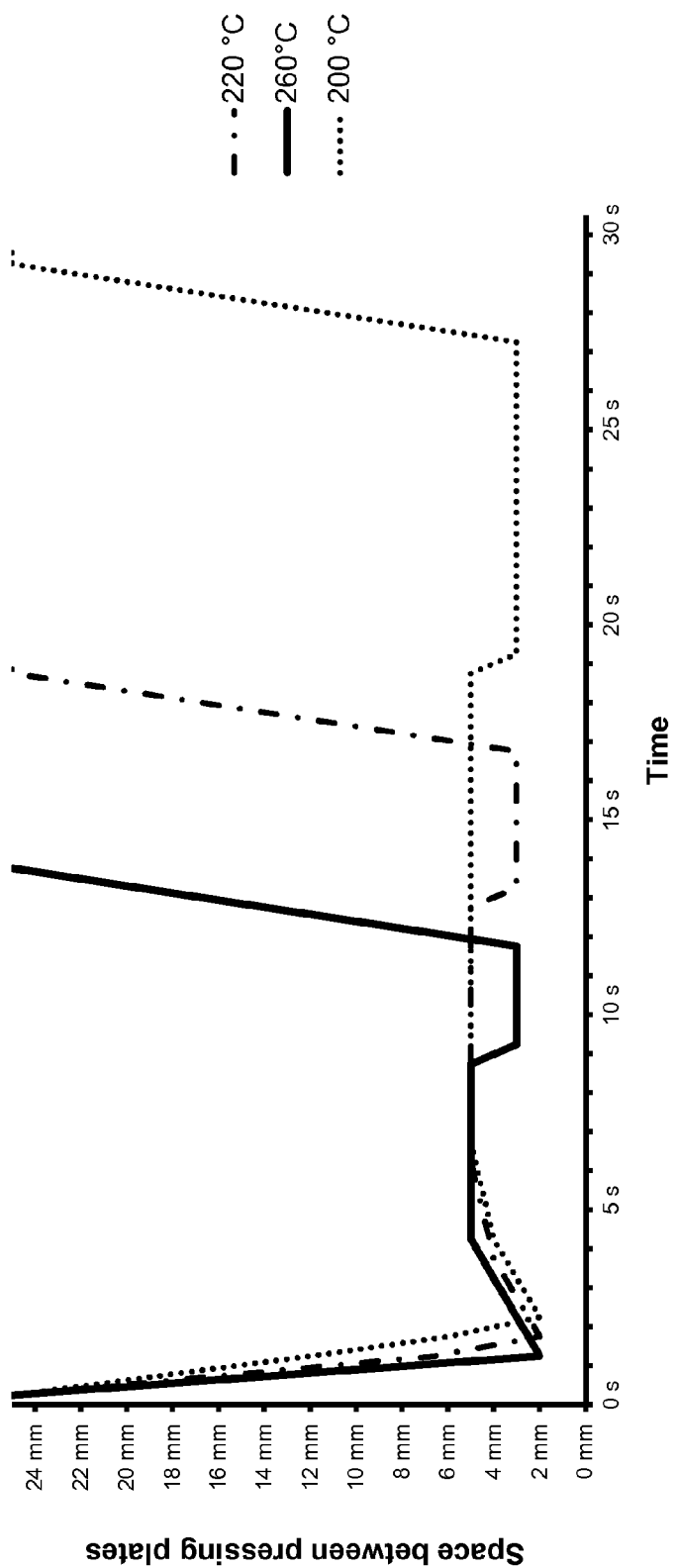

Shown is in:

FIG. 1: The working principle of the method and apparatus by way of a schematic view of an apparatus;

FIG. 2: The working principle of the method and apparatus by way of a schematic view of another apparatus;

FIG. 3: A capsule containing a portion of dough for one single flatbread;

FIG. 4: The two halfs of a capsule containing a portion of dough for one single flatbread;

FIG. 5: The two halfs of another type of a capsule containing a portion of dough for one single flatbread;

FIG. 6: The opening and emptying of a capsule containing a portion of dough for one single flatbread;

FIG. 7: The moment when the dough portion is falling out of the capsule;

FIG. 8: One single cylindrical capsule with its cover;

FIG. 9: A row of cylindrical capsules closed on their bottom side;

FIG. 10: The pouring out of single dough portions out of capsules of a moving row of capsules;

FIG. 11: Another way of isolating single dough portions out of capsules of a moving row of another type of capsules;

FIG. 12: The flattening of a dough portion within the apparatus;

FIG. 13: The baking of a dough portion squeezed in between two hot plates;

FIG. 14: The flattening of a dough portion by a rolling pin within the apparatus;

FIG. 15: The flattening of a dough portion by pressing shells within the apparatus;

FIG. 16: The delivering of a baked flat bread after completing of the baking process, by turning the baking plate;

FIG. 17: The delivering of a baked flat bread after completing of the baking process, by moving the two-parts of the baking plate apart;

FIG. 18: A sophisticated flat bread machine in a view open on one side;

FIG. 19: The flat bread machine according to FIG. 18 in a view open on the opposite side;

FIG. 20: Another flat bread machine in a view open on one side, functioning with another method for opening the dough capsules;

FIG. 21: A dough capsule in the shape of a cup with its top sealed by a foil;

FIG. 22: A collapsible dough capsule in the shape of a cup with predetermined folding lines;

FIG. 23: The collapsible dough capsule according to FIG. 22 in the collapsed state;

FIG. 24: A dough capsule in the shape of a cup with its top sealed by a foil, and with an upper edge forming a surrounding grove;

FIG. 25: A dough capsule in the shape of a cup with its top sealed by a foil, and with an upper edge forming a surrounding grove and with predetermined folding lines;

FIG. 26: A circular disc shaped foil piece with a weakening line, for sealing a cup-shaped dough capsule;

FIG. 27: A circular disc shaped foil piece with several weakening lines across the foil piece, for sealing a cup-shaped dough capsule;

FIG. 28: A circular disc shaped foil piece with crossing weakening lines, for sealing a cup-shaped dough capsule;

FIG. 29: A ball shaped dough capsule consisting of two hollow hemispheres;

FIG. 30: A ball shaped dough encapsulated in an evaporizable foil;

FIG. 31: A flat bread dough encapsulated in an evaporizable foil;

FIG. 32: A flat bread dough packaged and encapsulated in foil material;

FIG. 33: Flat bread dough capsules piled up and packed in a stack;

FIG. 34: Flat bread dough capsules arranged in a blister packaging;

FIG. 35: Flat bread dough capsules arranged in a row in a cardboard box;

FIG. 36: A flat bread dough capsule before inserting it into the machine by a pokayoke-system;

FIG. 37: A flat bread dough capsule conveying system for feeding the flat bread machine;

FIG. 38: A flat bread dough capsule conveyer carousel for feeding the flat bread machine;

FIG. 39: A flat bread dough capsule stack for feeding the flat bread machine;

FIG. 40: A flat bread dough capsule opening system for tearing the sealing foil off the capsule;

FIG. 41: A collapsible flat bread dough capsule before cutting open the sealing foil and before collapsing it;

FIG. 42: The collapsible flat bread dough capsule of FIG. 41 after cutting open the sealing foil and pressing down the bottom of the caspule by a piston, so the capsule collapsed and the dough fell down;

FIG. 43: A system for opening a ball-shaped capsule by means of rails that are spreading away from each other;

FIG. 44: A capsule consisting of two sealingly connected shells with orifices and a system for receiving, opening, discharging and disposing such capsules;

FIG. 45: The capsule and system of FIG. 44 while opening and emptying the capsule;

FIG. 46: The capsule and system of FIG. 44 while disposing the capsule;

FIG. 47: Press plates for a parallel closing and flattening the dough balls;

FIG. 48: Press plates with a lower horizontal resting plate and an upper swiveling plate for flattening the dough balls;

FIG. 49: Press plates with an upper horizontal plate and a lower swiveling plate for flattening the dough balls and subsequently releasing the flat dough;

FIG. 50: Press plates with an upper and lower swiveling plate for flattening the dough balls and subsequently releasing the flat dough;

FIG. 51: Press plates with an upper and lower horizontal plate, the upper plate having a removable stamp for creating a temporary hole for inserting the dough ball;

FIG. 52: Press plates which comprise releasable heating plates for cleaning purposes;

FIG. 53: A table presenting the pressing and heating process by showing the distance between the heating plates versus the time for three different temperatures.

DETAILED DESCRIPTION OF THE DRAWING FIGURES AND PREFERRED EMBODIMENTS

The starting point of the invention is a packaging system for the intermediate storage of a suitable dough. The dough is encapsulated in capsules which comprise a single portion for one single flatbread. In this form and shape, the dough portions can be stored for a period of at least three weeks. The capsules are specifically designed for an automatic opening and processing with a flatbread machine. The flatbread machine system is capable of preparing at least one flatbread from dough packed inside capsules fully automatically, without the need for the user to open or remove something of each encapsulated dough by hand.

As shown in FIG. 1, the machine or apparatus comprises these elements which are shown in schematic manner: A housing 1, containing a feeding compartment 2 which receives the capsules 3 containing a dough portion each. The capsules 3 will be transported by a conveyor system 4 toward the baking plates 7, 8, then opened and emptied by an opening system 5. The empty capsules 3 are being conveyed into a waste recipient 6, and the dough falls in between the baking plates 7, 8 and is then squeezed to a flat shape in between them. Then the heated baking plates 7, 8 start the baking process. When completed, the plates 7, 8 open and eject or release the fresh made flat bread into a recipient 9 which is equipped with a warm keeping system 10.

As shown in FIG. 2 in another execution of the apparatus, the capsules 3 are being conveyed to the apparatus in a chain or row 11. They reach an end position in which they are opened mechanically, hydraulically or pneumatically. In the shown example, a plunger 12 of an actuator 13 moves downward and increases the internal pressure in the capsule. Under this pressure, the sealing foil on the lower side of the capsule 3 will burst and the dough portion then falls through the leading pipe into the housing 1 of the machine and down between the baking plates 7, 8. The lower baking plate 8 is swivelable upwards along the indicated arrow, by a pneumatically, hydraulically, electrically or mechanically activated piston 14. After completion of the baking process, the lower baking plate 8 is swiveled down again and the finished flat bread slits down into the recipient 9 where the flat breads are kept warm by a warm keeping system 10. Automatically, the next dough capsule 3 is placed underneath the plunger 12 for preparing a next flat bread on request. If the machine contains more capsules 3 inside, the machine begins with the process time and again until the feeding compartment or the row 3 is emptied and all flatbreads have been made. The user can finally remove the flatbread recipient 9 with all finished flatbreads cooked like in a drawer.

As mentioned earlier, this invention comprises a dough capsule 3, which is defined here as a container, a pad or a package that contains at least one portion of fresh dough for making flatbreads such as tortillas, naan, pita, ruti, piadina, etc. The form of the dough capsule can be round, cubic, cylindrical (can or canister), a pouch, square, rectangular, triangular, etc. Depending of the machine class and its corresponding opening system, the capsule can be composed of at least one single piece that surrounds and encloses the dough mass. The form of the capsule should allow the machine system to open and separate or liberate the dough from the capsule automatically, without a need for the user to open or remove something. However, the form should be also simple and packable with low volume in order to make sense economically.

The material should primarily maintain the dough as long as possible by both refrigerated and unrefrigerated storage without affecting the consistency and backing characteristics of the dough. The material of the capsule may be for example but not limited to, soft, bio degradable, flexible, rigid, semi-rigid or a combination of them. The following materials or a combination of them (aluminum, paper, paperboard, can or canister, plastic or polymeric material), among others not listed here, may be used depending of the dough product and the class of the flatbread machine. The material and the form of the capsule should interact with the opening system of the machine in a proper way so that the dough does not stick to the capsule and no rest of material is transported together with the dough to the pressing plates.

The consumer should not open the dough capsule by himself. The dough capsule 3 is being opened by the flatbread machine's system automatically, or it can be opened by closing the machine by a lever or cover which enacts the opening. The machine system opens the capsule 3 only if the capsule 3 has not been opened or damaged before. This can be done, for example but not restricted to, with a code or chip on the capsule 3 that only the flatbread machine recognizes.

The design of the capsule 3 may include for example a weak point that allows the machine to separate the capsule easily from the dough but at the same time enough safely that no material particle of the capsule 3 comes into the dough by the separation and transportation to the next level.

To form a homogeneous dough mass flour, water, salt and other components such as yeasts or other microorganisms, leavening agents, emulsifiers, enzymes, etc. are mixed in adequate amounts. Depending of the dough product, different kind of flour may be used. For example white, yellow and blue corn (*Zea Maize*) flour for corn tortillas or wheat flour for wheat tortillas, or teff and other basic ingredients can be used for producing even other types of flatbreads. In addition, components such as jalapenos, tomato, cheese, honey, garlic and other herbs and spices as well as taste giving liquids such as wine, beer, soy sauce may be added to the dough mass. The dough may be yeast or chemical leavened and it may be proofed or un-proofed. Natural yeast (*Saccharomyces cerevisae*), baking powder (Sodiumbicarbonate) or other yeasts can be used. It can contain suitable preservation ingredients according to the state of the art. The components of the mass are combined and kneaded under circumstances at which the dough mass is developed. A typical recipe of a Corn Tortilla is this: (All percentages given are related to the weight of the dough).

Corn-Flour: 46±5% dried, nixtamalized corn flour, moisture: 13%±2%
Water: 54±5% temperature, 80-95° C. (soft water)
Additives: <=2% Salt or other preservatives as alcohol, sodium bicarbonate, sodium propionate, potassium sorbate, sorbic acid or other NDA conform ingredients.

A typical recipe for a Wheat Tortilla can be: (All percentages given are related to the weight of the dough).

Wheat-Flour: 68%, white flour type 440, protein content: 9.5-11.5%, water content: 13-14%
Water: 27.5%
Salt: 1%
Fat Vegetable: 2%
Baking powder: 1%
Acidulant: 0.3%
Preservation: 0.13%
Dough conditioner: variable The preservatives used can be those indicated above. Salt or other preservatives as alcohol, sodium bicarbonate, sodium propionate, potassium sorbate, sorbic acid or other NDA conform ingredients can be used, whatever is preferred. A correct Tortilla is not thicker than about 6 mm, and it can have a round, rectangular oval or other shape. Important is mainly its taste which highly depends on its freshness!

The user turns the machine on by enabling electricity to the machine. Then the user opens the machine's feed compartment for example by pushing a button or by pulling the compartment out. Then the user puts at least one dough capsule into the machine's feed compartment without opening the capsule or removing something of it. This may happen for example, but not limited to, by putting each dough capsule into a specific place of the compartment, for example by a revolver system, or by putting each dough capsule, for example into a feed system shaped as rail where the capsules are placed one after one. After this, the user closes the machine's feed compartment, for example by pushing a button or by pushing the compartment into the machine.

The machine opens the dough capsules 3 fully automatically without a need that the consumer opens or removes something of the capsule 3. This can happen for example, but not limited to, through pressure to the capsule 3 in different ways or by cutting a part of the capsule in order to break it and separate it from the dough. The following examples illustrate possible capsules 3 and their opening systems. If for example the dough capsule 3 is made from a semi-rigid material such as plastic, e.g. polypropylene (PP) or aluminum and the form of capsule 3 is round as shown in FIG. 3, the machine can push a the top of the dough capsule with a plunger in order to apply pressure on a special point of the capsule 3, so that the capsule 3 gets opened and the dough falls down into the next level of the machine in order to be pressed and then baked.

FIG. 4 shows the two halves of a ball-shaped capsule containing a portion of dough for one single flatbread. The two halves are fitting together and can be welded or glued together along their round edges by way of common methods.

Another example with a cylindrical form with special two rigid borders and with a combination of rigid material from aluminum by the body of the capsule and a semi-rigid material from aluminum by a special weak point of the capsule in the middle is shown in FIG. 5. The part on the left side of the figure can be plugged into the part of the capsule shown on the right side of the figure. At left edge of the part on the right side, this part is being welded to the bottom plate of the left part.

The machine feeding-system can push or move the capsules 3 in a feed-system which, at the end of the feed system moves the parts that hold the two rigid borders of the capsule, in such way that they diverge from each other so that the weak point of the capsule breaks which separates the dough 28 from the capsule 3 and the dough 28 falls finally down to the next level of the machine in order to be pressed, while the two pieces of the capsule are removed or transported to the waste container of the machine.

After the dough has been liberated from the capsule, the dough is transported to next level where the dough is going to be pressed by falling down for example direct to the pressing system or to a passage, for example a tube, that facilitates the exact positioning of the dough before pressing.

When the dough 28 has reached the appropriate place to be pressed, the dough gets pressed automatically. The pressing may happen for example, but not limited to, through two rollers as shown in FIG. 12, or two plates as shown in FIGS. 1, 2 and 13, which may be partially heated up to 218° C. in order to avoid mis-shaping and the formation of translucent spots. Other press systems comprise a convex press as shown in FIG. 15, a "toothpaste"-press as shown in FIG. 14 may be used. The end material of the parts that have contact with the dough may be for example Teflon or any other material that avoids the sticking of the dough to the end material.

After the dough has been pressed, the machine cooks or bakes the dough and converts it into a desired fresh flatbread. The heating may happen for example, but not limited to, by induction. By using two plates as shown in FIGS. 1, 2 and 13 for example, that can be heated with induction technology, the dough can be pressed and formed into a disc in seconds. As the plates are cold in the seconds that the dough gets pressed, the dough will not suffer formation of translucent spots and the shape remains stable. As induction reaches higher temperatures significantly quicker, in this case, after the two plates come together by pressing the dough into a flatbread, the plates reach a cooking temperature of more than 260 C.° in seconds and the pressed dough gets cooked instantaneously and reaches desirable toast marks.

While the dough get's pressed and heated, the material of the opened capsules is removed or transported to the waste recipient automatically. After the flatbread is cooked and ready to eat, it is transported to the removable flatbread recipient, which retains at least one flatbread warm by a warm keeping system. The transportation of the cooked flatbread to the removable warm recipient may happen for example, but not limited to, by moving the plate of the bottom in one of the sides down, in order that the flatbread falls down from that side as shown in FIG. 16, or by separating the plate from the bottom in two parts, so that the tortilla falls down in the middle as shown in FIG. 17.

If the machine contains more capsules inside, the machine begins with the process again until the feed compartment get's empty and all flatbreads have been made. The user can finally remove the flatbread recipient with all flatbreads cooked ready to eat.

In the following, particular executions of the method and machine are being disclosed. FIG. 18 does show a more sophisticated flat bread machine in a view open on one side. Side 15 is the front side of the machine, side 16 is the rear side of the machine. The machine comprises a housing 1, and on top of it, a container 17 for the capsules to be fed into the machine is shown. One side of the machine housing 1 is here opened since the respective cover plate of the housing 1 was removed in order to give free sight into the interior of the machine. What can be seen in this drawing is the mechanism by which the capsules 3 are being handled once they are fed into the machine from the container 17 in which they are stacked. The capsules 3 used here have the shape of a collapsible cup. The upper opening of the cup is sealed with a gas-tight foil 18, and the cup contains a portion of dough for the single flat bread to be prepared. Capsule and dough must not be form-fitted in order to ensure an easy emptying of the capsule, rather, the dough should not fill the cup-shaped capsule but leave a distance of approx. 5 mm to the covering foil 18. The cups are stacked upside up in the container 17. The lowest cup or capsule 3 can be seen partly. It is being hold by two fingers 19 which are extending perpendicularly from a rotatable disc 20 which is rotatable around a horizontal axis 21. This disc 20, when activated, does rotate in counterclock direction in the shown drawing, around 180° each time when the rotation is initiated. While rotating, the discs's fingers 19 hold a cup-shaped capsule 3 between them, and rotate the same around the central axis 21. The foil-side of the cup is then gliding along a cylindrical wall 22. This cylindrical wall 22 is being hold by several struts 23 that are connected to an inner cylindrical wall 24 having a smaller radius. The disc 20 and its fingers 19 rotate until the cup is placed upside down on a holding plate having a central hole (not shown in this drawing). The edge of the cup-opening rests on the edge of the hole and then, a plunger (not shown in this drawing) moves down, collapses the cup by pressing onto its bottom side, thereby cutting or bursting open the sealing foil 18. Consequently, the dough portion in the capsule 3 will fall down through that hole onto the lower baking plate 8. An optical sensor recognizes when the dough has fallen down onto said plate 8. This baking plate 8 is movable in horizontal direction to the left, in order to reach the horizontal displaced position in which it is ready to serve as lower pressing plate. An upper pressing and baking plate 7 (not shown in this drawing) is then moving from above downward and squeezes the dough portion between the two plates 7, 8 until the dough assumes a flat bread shape. Then, heating means will act and the dough is being baked. This heating means can comprise electrical heating coils within the plates 7, 8, or induction heating coils, or even gas burners that heat up the plates 7, 8. Once the baking process is finished, the lower plate 8 is being pulled back. This lower plate 8 is swivelable around a moving axis 25 at its rear end, and that is indicated with a dotted line, and that is movable in its entirety in horizontal direction toward the front side 15 of the machine. In the position of the lower plate 8, when displaced to the left from the position as shown in FIG. 18—, the plate 8 is first supported by upper rails (not shown) in order to resist the pressing force to be applied, and when pulled back, it will be swiveled down around its axis 25 since its front end is then being guided along lower guiding rails 26 that describe a bow as will be explained in connection with FIG. 19. When the lower plate 8 is swiveled down temporarily, the finished flat bread will glide away from the lower plate 8 and ultimately being dispensed through the slit 27 in the front side 15 of the housing 1 of the machine. In the lower back of the machine, a recipient container 6 can be recognized. Once the cup or capsule 3 is emptied, disc 20 will further rotate counterclock-wise and shift the capsule 3 toward the backside 16 of the machine where it will fall down into this recipient container 6 for waste capsules.

FIG. 19 does show a similar machine when seen from the opposite side, that is from the left side, with opened left side panel of the housing 1. Here, one can see the feeding container 17 and the capsules 3 in the form and shape of cups piled up within the container 17 to a stack. The disc 20 which is arranged here rotatable around an axis 21 which does extend to the rear wall 16 of the housing 1, and the fingers 19 on the disc 20 are extending in horizontal direction from the disc 20, arranged perpendicularly on said disc 20. The lowest cup 3' in the container 17 already rests between two fingers 19 of the disc 20, while another cup 3" has already been rotated around axis 21 in an upside down position onto the holding plate 29 having a central hole. The dough has already fallen down and is now resting on the lower pressing and baking plate 8. When the disc 20 further rotates, it will move the upper cup 3' into the lower upside-down position, and the lower cup 3" will be disposed into the recipient container 6 for the emptied cups or capsules 3. Once the dough is placed on the pressing and baking plate 8, said plate 8 will be moved horizontally toward the front side 15 of the machine. On its side at the front end, bolts 30 are extending to the side and these bolts 30 are being guided in guiding rails 26, 31. In a first movement, here from the left to the right, the pressing and baking plate 8 will be moved by a motor in horizontal position while its side bolts 30 are guided along the upper guide rails 31 until the bolts 30 reached the front end of these guide rails 31. In the front end area 32, there are spring-loaded separators 33 arranged. The bolts 30, when moving from the left to the right, will swivel these separators 33 from the shown position into a horizontal position so they give way for the bolts 30 to pass them and ultimately reach the front end 32 of the guide rails 31. In such position of the bolts 30, the pressing and baking plate 8 has reached is operating position for the pressing and baking process. For pressing the dough which is placed on this pressing and baking plate 8, an upper pressing and baking plate 7 is arranged parallel to the lower pressing and baking plate 8. Said upper plate 7 is hanging on a knee-knuckle press mechanism 34. In the shown example, there are two levers 35, 36 on each side. When their central joints 37 are being pushed away from each other, e.g by a mechanical mandrel/spindle, or linear guide unit, or by a hydraulic or pneumatic piston/cylinder arrangement, the upper pressing and baking plate 7 will be lowered down and ultimately press with increasing force onto the dough portion laying on the lower plate 8. The pressing force will increase due to the knee-knuckle effect of the chosen arrangement 34. It is though clear that other mechanism for actuating such a pressing can be chosen. Once the dough portion is pressed into the shape of a flat bread, the baking process starts by the ready heated baking plates 7, 8. The actual baking will be performed at a selected temperature, e.g. between 200° C. and 220° C. for tortilla dough. These temperatures are only given as examples and are not to be understood as definite limits. Depending on the dough used, lower or higher temperatures may be suitable. The machine can offer a temperature range from 200° C. to 350° C. depending on what is required. Once the dough baking process is finished, the baking process is stopped by moving the baking plates apart from each other and by dispensing the finished flat bread. The upper plate 7 will be lifted up, and the lower plate 8 will be pulled back. Now, when pulling the lower plate 8 back, its side bolts 30 are being guided along the bow-like shaped lower guide rails 26 since the spring loaded separators 33 on both sides of the plate 8 reassumed the shown position that ensures that the bolts 30 are guided downward into the lower bow-shaped guiding rails 26. Another such separators 38 ensure that the bolts 30 are reaching their initial position as shown in FIG. 19, and for the next movement to the right, they will glide over these separators 38 into the horizontal guide rails 31.

Basically, the feeding compartment 17 can be either integrated into the machine or form an external compartment, e.g. it can be just the container in which the capsules are being distributed. The machine's compartment can easily be refilled in any case. It can cooperate with the conveyer system for feeding the single capsules to the opening and emptying system. The recipient container 6 is designed releasable from the machine, e.g. like a drawer so the empty capsules can easily be removed from the machine.

FIG. 20 discloses another flat bread machine in a view open on one side, functioning with another method for opening the dough capsules. The also cup-like shaped capsules 3 with sealing foil 18 over their opening are being inserted upside down into the machine by lifting up a swivable cover plate 39. The capsules 3 are placed on a conveyer belt 40 that runs around two shafts 41, 42. At the front end of said conveyer belt 40, two shafts 43, 44 with rubber teeths extending away radially from the circumference of the shafts 43, 44 move in different directions, the first one 43 clockwise, the adjacent one 44 at the front end in counterclock-wise direction. These shafts have a diameter of approx. 20 mm which proved to work fine. The foils 18 of the capsules 3 have an overlap of approx. 5 mm that is always bent away from the capsules 3 upper edge. Therefore, when the capsules 3 are laying upside down on the conveyer belt 40, these overlaps are under a tension to bend downward. Once the overlap of a capsule 3 reaches the shafts 43, 44 with the rubber teeth, this overlap will be packed. The second shaft 44 is positioned a bit higher so it will surely grip the foil overlap. The foil is then pulled down between the two shafts 43, 44 and torn away from the edge of the opening of the capsule 3, and the capsule is forced to move over the two shafts 43, 44 and to pass them. Therefore, the foil 18 will be torn away from the capsule 3 and the open capsule 3 will glide onto the inclined holding ring 45. Instantly, the dough will fall out of the capsule and fall in between the two pressing and baking plates 7, 8. An optical sensor recognizes when the dough has fallen down in between the plates 7, 8. The upper pressing and baking plate 7 is swivelable around an exentrically arranged axis 46, and an actuator 47 can then swivel the upper pressing and baking plate 7 down onto the lower plate 8. The excentric arrangement of the axis 46 will ensure an increasing pressing force, the more the pressing plate 7 did already swivel in downward direction. After pressing the plates will move up a little bit again. After cooking the flatbread, the upper pressing plate will lift, that the ready to eat flatbread slides out of the machine by gravity. In this case, there is no warm keeping container for the flatbreads.

FIGS. 21 to 29 show various types of suitable capsules 3. FIG. 21 e.g. does show a dough capsule 3 in the shape of a cup with its top sealed by a foil 18. The dough portion is being filled into such a capsule under an atmosphere of an inert gas such as Nitrogen. The capsules are made of a gas-tight plastic as known in the food and beverage industry, and the foil is a laminate of aluminum foil that is gas-tight. Semi-permeable foils can be used which allow $O_2$ to permeate from within the capsule but not in opposite direction. For special purposes, these capsules and foils can even be made in oxygen tight manner as known in the state of the art. This type of cup-like capsule 3 can be piled up in empty state, and even a re-use may be an option. In such case, the capsules should be piled up in a recipient container for the emptied cups so they can be easily recycled and brought back to the seller in the original cardboard box in which they have been sold.

FIG. 22 sows a collapsible dough capsule 3 in the shape of a cup with predetermined folding lines 48. Else the capsule 3 is similar or equal to the one shown in FIG. 21. But this collapsible capsule 3 allows it to reliably empty it form the containing dough since it thes collapse in a defined form. In FIG. 23, the collapsed dough capsule 3 of FIG. 22 is shown in the collapsed state. In order to reach this state, the upside down placed capsule 3 will be pressed from above by a plunger or piston while its opening edge rests on a ring which leaves the space under the opening free so the dough can freely fall through said ring opening once the sealing foil 18 has been opened. For better opening of such capsules, the foil 18 may be equipped with prepared weaking lines, as explained later.

FIG. 24 does show a dough capsule 3 in the shape of a cup with its top sealed by a foil 18, and with an upper edge 49 forming a surrounding groove 50. The purpose of this particularly shaped edge 49 and said groove 50 will be explained later, in connection with the opening process as shown in FIGS. 41 and 42. Advantageously, this cup-like capsule 3 is also equipped with folding lines 48 as already described to FIG. 22 and shown here in FIG. 25.

FIG. 26 shows a circular disc shaped foil piece 18 with a weakening line 51, for sealing a cup-shaped dough capsule 3. Such weaking line can be reached making the foil thinner along this line, as already know in the state of the art, e.g. by a hot welding knife that is pressed down onto the foil, against a hard support plate. In an alternative way, the weakening lines can be obtained by a fine perforation of a two-layer foil while only one layer of the foil is perforated to keep it airtight. In FIG. 27 the circular disc shaped foil piece 18 is equipped with several weakening lines 51 across the foil piece, and in FIG. 28, the weakening lines form a single cross over the circular foil 18. The foil has two basic purposes on such capsules. Firstly, the foil must hermetically close the capsule 3 in order to keep air away from the dough. Secondarily, the foil 18 does ensure that in the course of emptying the capsule 3, the dough never gets in touch we a part of the machine, not even with the knife that opens to foil 18 if such knife is being used. The opening of the capsule, however, will be described later, in connection with FIGS. 40, 41 and 42.

In FIG. 29, an entirely different type of a capsule is shown. This is a ball shaped dough capsule 3 consisting of two hollow hemispherical shells 52 that are equipped with little knobs 53 at their zeniths. The two hemispherical shells 52 can be closed and sealed by heat welding or gluing them together. Then, the dough portion is hermetically enclosed. The handling and opening of such capsules 3 is described later, in connection with FIG. 43.

The capsules can be sold with a second packaging material or not. If the capsule foil is even perforated, it is best to use a second package, e.g. a cardboard box, for guarding their inner foil 18. As yet another type of capsule, FIG. 30 shows a ball shaped dough encapsulated in an evaporizable foil 54 that forms the capsule. The foil, once heated up in the baking process, will disappear by evaporization. In FIG. 31, an already flat bread dough is encapsulated in such an evaporizable foil 54. And in FIG. 32, yet another way of packaging the dough is shown. Here, an already flat dough is encapsulated in a suitable foil material 55 which can later be torn apart either by the machine or by hand, in order to release the inlaying dough.

In a next section, the handling of these capsules 3 is shown and explained. FIG. 33 shows flat bread dough capsules 3 piled up and packed in a stack. These stack is then packaged in a cardboard box in which the set of capsules are being sold and handled. From this cardboard box, the capsules 3 can be inserted into the feeding compartment 2 of the machine, or the cardboard box may itself form the feeding compartment of the machine so it simply needs to be opened and put onto an insert of the machine.

In FIG. 34, an alternative packaging for the distribution and handling of capsules 3 is shown. Here, the flat bread dough capsules are arranged in a blister packaging which comprises a top foil 57 which extends over all these four capsules 3. For using the capsules 3, this top cover foil 57 will be torn away and the four still sealed capsules 3 are then separated and can be inserted into the machine. According to FIG. 35, the flat bread dough capsules 3 are arranged in a row in a cardboard box 58. Likewise, the single capsules 3 can be taken out of the box and then inserted into the machine's feeding compartment 2. In FIG. 36, the insertion of a single capsule 3 into the machine is shown. In this example, the machine and the capsule 3 form a Pokayoke-system that ensures the correct and fool-proved insertion of the capsules 3 into the machine through a particular opening 59 in the housing 2 of the machine.

In this section, various ways of the conveying of the capsules 3 within the machine are being disclosed. In FIG. 37, the flat bread dough capsules 3 conveying system consists of a frame 60 which is put down over a row of capsules. This frame 60 is displaceable within the machine in order to feed the capsules for feeding them into the opening system 5 for opening the capsules and emptying them so the dough portion will fall onto the lower pressing and baking plate 8. This frame 60 can be moved by mechanical, hydraulic or pneumatic means. The conveying system according to FIG. 38 makes use of a carousel 61 which contains wholes 62. The capsules are projecting out of these holes 62 from the lower side of the carousel while they are laying upside down on a lower plate. When the carousel is rotating, the capsules 3 are being moved respectively, and once a single capsule 3 arrives over a respective hole in the lower plate so only its edge will be supported, a piston can act onto the bottom side of the capsule 3 which is now on the upper side, thereby bursting the sealing foil 18 and pressing the dough out so it will fall onto the baking plate 8. Then, the carousel 61 rotates again until the empty capsule 3 will fall into a recess in the lower plate, and will ultimately being disposed in the recipient container for the empty capsules 3. FIG. 39 shows the cardboard box containing a stack or pile of capsules 3 as already shown in FIG. 33. The cardboard box 56 is here placed on the top side of the machine housing 1, and the stack is being lowered due to gravity as the lowest capsule is falling into the conveyer system of the machine for further processing said capsule and the dough contained in it. The capsule may e.g. fall onto a conveyor belt 40 as shown in FIG. 20.

In this section, various ways of opening the capsules are being disclosed and explained. In FIG. 40, the opening system as already mentioned and disclosed in FIG. 20 is shown in a perspective view for better understanding. At the front end of said conveyor belt 40, next to its front shaft 42, two shafts 43, 44 with rubber teeth extending away radially from the circumference of these shafts 43, 44 move in different directions, the first one 43 clockwise, the adjacent one 44 at the front end in counter clock-wise direction as indicated with the arrows. The capsule 3 is shown here in an elevated state, upside down, as it will lay on the belt 40. Its opening edge 63 does extend radially and is closed and sealed with the foil 18. The foil bends away from the plane of the opening edge, in the upside down position of the capsule 3 it bends downward, as shown in the drawing. Now, when the capsule 3 is being moved on the belt 40 in the direction of the arrow indicated, its foil will ultimately move into the area between the shafts 43, 44. These two shafts 43, 44 grip it and tear it down in between them, while the capsule 3 further moves in horizontal direction over these two shafts 43, 44 and ultimately glides onto a frame 64 or onto a holding ring 45 as shown in FIG. 20. Since the capsule 3 is now open, the dough will fall due to gravity onto the lower baking plate 8 of the machine.

Another solution for emptying the capsules 3 is shown in FIGS. 41 and 42. Here, collapsible flat bread dough capsules 3 are being used. They contain folding lines 48. The capsules 3 are positioned upside down on a support plate 68 with a hole that is of a slightly larger diameter than the opening of the capsule 3. The opening edge 49 of the capsule forms a groove 50, and the entire opening edge is covered with a circular foil piece 18 that sealingly closes the capsule 3. For opening the same, a circular stationary knife 66 is arranged underneath the groove 50 which extends almost over the entire circumference, only leaving a section of approx. 20° to 30°. On the inner side of the knife, a circular support 67 defines how low the capsule's opening edge 49 may move against the force of a compression spring 65. For emptying the capsule 3, it will be pressed down onto the support ring 67 by a plunger 12 or piston as shown in FIG. 42. Once the compression spring 65 is compressed, the circular knife 66 will cut open the foil 18 and move into the groove 50, then the capsule 3 will be compressed and collapse and consequently, the dough in the capsule 3 will fall over the remaining foil 18 that still hangs on its edge over a little remaining material bridge where the circular knife 66 is interrupted and did not act. Thereby, the dough does not touch any part of the machine. This is crucial for keeping the best hygienic level. Not even the circular knife 66 will touch the dough. The dough merely touches the inner side of the capsule 3 and the inner side of the foil 18, and will freely fall onto the lower baking plate 8. In an alternative embodiment, a thermic opening of the foil by using a heated up wire that is being pressed against the foil may be an option.

FIG. 43 shows a system for opening ball-shaped capsules 3. The knobs 53 at the zeniths of the two hemispheres 52 or hemispherical shells 52 are guided by rails 53. For opening the capsule 3, the rails 53 are spreading away from each other and the capsule 3 is mechanically pushed by a plunger in the direction as indicated with an arrow. Therefore, the two hemispherical shells 52 are being pulled apart and the dough falls down. The hemispherical shells 52 will then leave the rails at their ends and fall into the recipient container 28 for the empty capsules 3.

FIGS. 44 to 46 disclose yet another method for opening respective capsules 3. A single capsule 3 consists of two halves 70 that are hermetically sealed along their openings. On the outer side these halves are equipped with orifices 71. The opening system comprises two rails 72, and on their lower end, swivelable rail hooks 73 are attached which can be activated by a motor. As shown in FIG. 44, a capsule 3 of that sort falls down and its orifices 71 will fall into the hooks 73 of the swivelable rail hooks 73. In a second step, the rail hooks 73 are being swiveled apart from each other as shown in FIG. 45. This will open the capsule. Its two halves 70 are rotated in a position where their openings are on the lower side. Consequently, the dough falls down due to gravity. Then, the rail hooks 73 are further rotated until they reach the position as shown in FIG. 46. Now, the empty halves 70 will themselves fall down due to gravity, and they can slide on a pathway down into the recipient 6 for the empty capsules.

In FIG. 47, press and baking plates 7, 8 for a parallel closing and flattening of the dough balls are shown. It is advantageous if the plates move always parallel to each other for pressing. Only then a ball-like dough will be flattened equally to each of its sides and ultimately, a circular flat dough can be obtained. In FIG. 48, press and baking plates 7, 8 are shown with a lower horizontal resting plate 8 and an upper swiveling plate 7 for flattening the dough balls. In such an arrangement, additional means will be needed in order to remove the finished baked flat bread form the lower plate 8. In FIG. 49, the press and baking plates 7, 8 comprise an upper horizontal plate 7 and a lower swiveling plate 8 for flattening the dough balls and subsequently releasing the flat dough by swiveling the lower plate 8 as shown. In FIG. 50, the press and baking plates 7, 8 are both swiveling plates for flattening the dough balls and subsequently releasing the flat dough. In FIG. 51, the lower press and baking plate 8 is a horizontal plate 8, as also the upper plate 7. In order to feed the dough onto plate 8, the upper plate 7 comprises a hole and a stamp which fits into this hole in order to obtain a flat lower surface of said upper plate 7. The stamp can move up and down as the entire upper plate 7 can move up and down for pressing and baking. FIG. 52 discloses press and baking plates 7, 8 which comprise releasable, separate heating plates 76, preferably coated with a Teflon or ceramic layer, so they can easily be removed for cleaning purposes. The dough sticks to the plates, therefore low adhesion plates have to be used to reduce the resistance and therefore reducing the pressing force. The pressing force for wheat dough is substantially higher than for corn dough. The pressing and heating or baking plates 7, 8 can have a ceramic or Teflon coating so the dough is not adhering to them. In general, the press and baking plates must be stiff to sustain forces but also a bit flexible.

FIG. 53 does show a table presenting the pressing and heating process by showing the distance between the heating plates versus the time for three different temperatures, that is for 220° C., for 260° C. and for 200° C. Typically, the pressing force will be adjusted by controlling the machine in such manner that the pressing plates are moving toward each other, after they have been heated up to the required temperature, and then moving until a distance between them of only some 2 mm will be reached. After a couple of seconds, the pressing force will be lowered so the plates will move apart to a distance of approx. 5 mm. This will allow the dough and the wheat in it to release moisture. Ultimately, after a few seconds another increased pressing force is activated to press the plates to a distance of again 2 mm. The higher the temperatures of the baking plates, the shorter is the baking time. The temperature of the plates may also be varied during the baking process. This is a matter of experience and control of the heating means, and it depends on the particular composition of the dough. If a resistor heating is being used, approx. 1800 W power is needed in order to reach a temperature of 200 to 260° C. in a short enough time. Inductive heating is an option.

The invention claimed is:

1. An apparatus for an automatic preparation of flat breads, comprising:
   a first heatable baking plate and a second heating plate, wherein at least one of said first heatable baking plate and said second heating plate is moveable for opening and closing for varying a distance in between said first heatable baking plate and said second heating plate;
   a recipient compartment for receiving a finished flat breads after opening said first heatable baking plate and said second heating plate;
   a feeding system and compartment for receiving and conveying a plurality of capsules hermetically sealed and each containing a portion of dough for producing one single flat bread, wherein the feeding system comprises a compartment for receiving a stack of cup-shaped capsules having one side that is a foil-side, the conveyer and opening system comprising a disc rotatable around a horizontal axis and the disc having several fingers extending in a perpendicular direction from the disc for gripping a capsule between two fingers, a cylindrical wall for moving the capsules with said foil-side along said cylindrical wall, and opening system comprising a holding plate with an opening for positioning the capsule upside-down on said holding plate by rotating the disc until such position of the capsule is reached, the opening system further comprising a plunger for pressing from above onto the bottom side of the capsule, further a circular knife with a diameter of more than the opening of the capsule, for pressing the capsule over this knife and partly opening the foil, and a knee-knuckle press mechanism with several levers connected with joints for pressing the pressing and baking plates by a mechanical, hydraulic or pneumatic actuator parallel to each other, and control means for varying the distance of the heating plates while baking between two mm and five mm along a pre-determined measure along time, and heating means in said first heatable baking plate and a second heating plate with a first heatable baking plate and a second heating plate comprising resistive heating coils, inductive coils, or heating means including a gas burner for heating up a first heatable baking plate and a second heating plate; and an opening system for opening the each first arriving capsule by pressure or by cutting means so that the dough inside the capsule falls out of the capsule and downwardly onto said first heatable baking plate.

2. An apparatus for an automatic preparation of flat breads with a first heatable baking plate and a second heating plate, comprising:

a feeding system and compartment for receiving and conveying at least one capsule hermetically sealed and containing a portion of dough for producing one single flat bread;

an opening system for opening each of the first arriving capsule via pressure or a cutting device so that the dough inside the capsule falls out of the capsule and downwardly onto a first heatable baking plate, wherein said opening system comprises a holding plate with an opening for holding the capsule upside-down on said holding plate, the opening system further comprising a plunger for pressing from above onto a bottom side of the capsule and, further, a circular knife with a diameter larger than the opening of the capsule for pressing the capsule over the circular knife for partly opening the foil;

at least one of said first heatable baking plate and said second heating plate is moveable for opening and closing for varying a distance in between said first heatable baking plate and said second heating plate, and said first heating baking plate and said second heating baking plate comprising resistive heating coils, inductive coils, or heating means including a gas burner for heating up said first heating baking plate and said second heating baking plate;

a knee-knuckle press mechanism having a plurality of levers connected with joints for pressing said first heating baking plate and said second heating baking plate by a mechanical, hydraulic or pneumatic actuator parallel to each other, and control means for varying the distance of the said first heating baking plate and said second heating baking plate while baking between two mm and five mm along a predetermined measure of time; and, a recipient compartment for receiving a finished flat breads after opening said first heatable baking plate and said second heating plate.

3. The apparatus for an automatic preparation of flat breads according to claim 2, wherein said feeding system comprises a conveyer belt for moving upside-down positioned capsules of cup-like shape, sealed with a foil to an opening system comprising two adjacent shafts rotatable in opposite directions for tearing the foil in a downward direction while the respective capsule is moving over them, and, further comprising a holding ring onto which the opened capsule is movable, for the dropping of the dough, and at least one of said first heatable baking plate and said second heating plate being swivelable against the other by via a movable piston, and control means for varying the distance of said first heatable baking plate and said second heating plate while baking between 2 mm and 5 mm along a predetermined measure along time, and a conveying system for conveying the emptied capsules into a waste recipient compartment.

4. The apparatus for an automatic preparation of flat breads according to claim 2, wherein said first heatable baking plate and a second heating plate are made of an induction heatable material with induction coils.

5. The apparatus for an automatic preparation of flat breads according to claim 2, wherein said first heatable baking plate and a second heating plate are made electrically heatable by corresponding electrical resistive heating coils.

* * * * *